United States Patent [19]

Oshima et al.

[11] Patent Number: 5,115,854
[45] Date of Patent: May 26, 1992

[54] LOW ROLLING RESISTANCE PNEUMATIC RADIAL TIRES HAVING AN IMPROVED APPEARANCE

[75] Inventors: Kazuo Oshima, Higashiyamato; Shizuo Iwasaki, Kodaira, both of Japan

[73] Assignee: Bridgestone Corporation, Tokyo, Japan

[21] Appl. No.: 593,531

[22] Filed: Oct. 5, 1990

Related U.S. Application Data

[63] Continuation of Ser. No. 228,091, Aug. 4, 1988, abandoned, which is a continuation of Ser. No. 939,974, Dec. 10, 1986, abandoned.

[30] Foreign Application Priority Data

Feb. 21, 1986 [JP] Japan ................... 61-36564

[51] Int. Cl.⁵ .............................. B60C 9/08
[52] U.S. Cl. ..................... 152/556; 152/451
[58] Field of Search .......... 152/556, 451, 548, 560, 152/527; 57/902

[56] References Cited

U.S. PATENT DOCUMENTS

| | | | |
|---|---|---|---|
| 3,851,692 | 12/1974 | Takemura et al. | 452/527 |
| 4,262,725 | 4/1981 | Rodenkirch | 152/556 X |
| 4,387,756 | 6/1983 | Ogawa et al. | 152/209 R |
| 4,603,083 | 7/1986 | Tanaka et al. | 264/210.8 |
| 4,628,978 | 12/1986 | Imai et al. | 152/556 |
| 4,793,131 | 12/1988 | Mizuno et al. | 152/451 X |

FOREIGN PATENT DOCUMENTS 2332720  1/1974  Fed. Rep. of Germany ...... 152/556

*Primary Examiner*—Geoffrey L. Knable
*Attorney, Agent, or Firm*—Sughrue, Mion, Zinn, Macpeak & Seas

[57] ABSTRACT

A low rolling resistance pneumatic radial tire having an improved appearance comprises a carcass composed of a single rubberized carcass ply containing cords therein. The carcass ply cord is a high tenacity vinylon cord having characteristics after vulcanization represented by the following equations:

$$0.5 \leq E \leq 3 \tag{1}$$
$$E \times \Delta S \leq 5 \tag{2}$$
$$S \geq 14.5 - 12 N_T \tag{3}$$

Further, the carcass ply has the number of overlapped cords of not more than 15 at the shoulder portion in its joint portion.

19 Claims, 2 Drawing Sheets

FIG_1a
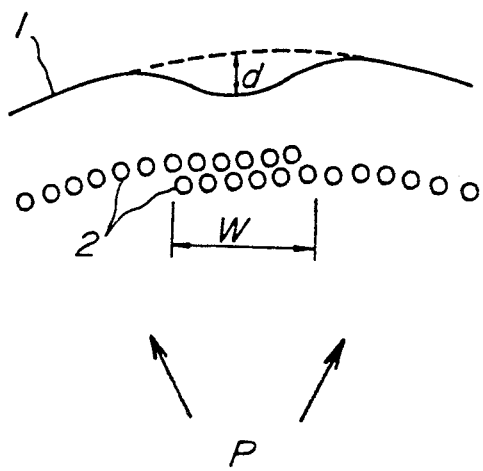
FIG_1b
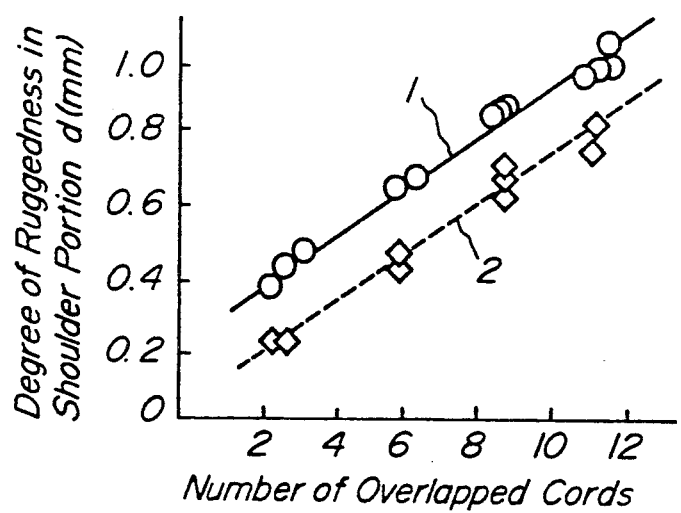

FIG_2
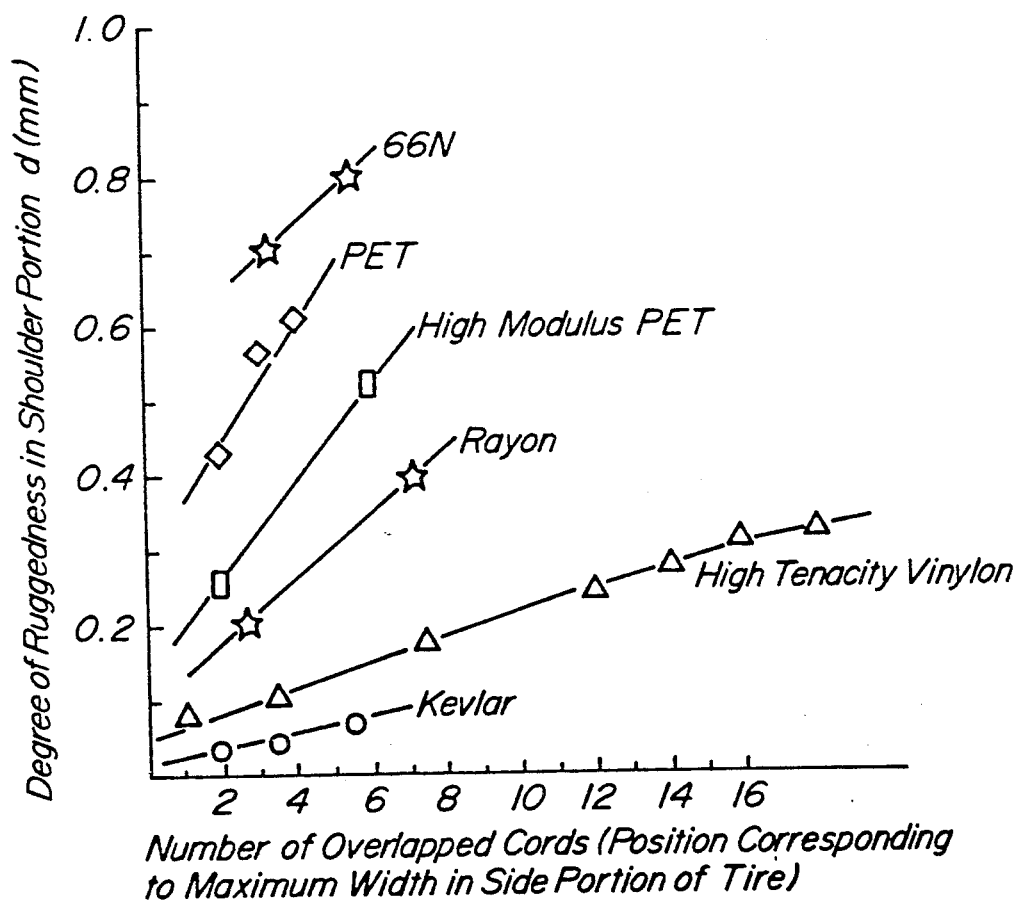

LOW ROLLING RESISTANCE PNEUMATIC RADIAL TIRES HAVING AN IMPROVED APPEARANCE

This is a continuation of application Ser. No. 07/228,091 filed Aug. 4, 1988, now abandoned, which is a continuation of application Ser. No. 06/939,974 filed Dec. 10, 1986, now abandoned.

BACKGROUND OF THE INVENTION

1. Field of the Invention

This invention relates to a pneumatic radial tire having an improved appearance and a low rolling resistance by using high tenacity vinylon cords as a cord for carcass ply.

2. Related Art Statement

In Japanese Patent laid open No. 60-131,302, a pneumatic radial tire is disclosed that is reinforced with a single carcass ply and having considerably improved high-speed durability, rolling resistance and cornering stability, wherein polyester cords were used as a carcass ply cord. In case of using such a polyester cord having a restricted strength, it was obliged to take a means for thickening the ply cord in order that the number of carcass plies is made one for insuring the safety of tire. Therefore, the ply cord was thickened to more than 4,500 deniers. When such a thickened ply cord is applied to the single carcass ply, the gauge of the overlap portion of the carcass ply becomes thicker in the building of the tire. This in turn unfavorably produces ruggedness in the shoulder portion of the tire to considerably damage the tire appearance when the tire is inflated under a given internal pressure.

Therefore, the greatest care must be taken in causing no overlapping of such thickened cords in the overlap portion of the rubberized carcass ply, which results in a large reduction of tire building efficiency.

Further, the use of high modulus polyester cord as a carcass ply cord has been proposed in Japanese Patent laid open No. 60-113,702. The inventors have made various reproduction experiments by varying the number of overlapped cords in the overlap portion of the carcass ply and found that the degree of ruggedness (d) in a shoulder portion 1 of a tire as shown in FIG. 1a is largely dependent upon the number of cords 2 in the overlap portion (W) of the carcass ply and the essential solution of ruggedness in the shoulder portion proposed in Japanese Patent laid open No. 60-113,702 is not attained by the use of such a high modulus polyester cord. In the reference, a relation between the number of overlapped cords in the shoulder portion and the degree of ruggedness is shown in FIG. 1b when a single carcass ply containing polyester cords of 1500 d/2 with a twisting number of 40×40 T/10 cm is applied to a tire of 185/70 HR 13 (internal pressure P=2.5 kg/cm$^2$), wherein a curve 1 is the case of using usual polyester for the polyester cord and a curve 2 is the case of using high modulus polyester for the polyester cord disclosed in Japanese Patent laid open No. 60-113,702. As a result of sampling inspections, the ruggedness degree in the shoulder portion is 0.55 mm on average in case of using the usual polyester cord, while when using the high modulus polyester cord, the ruggedness degree is reduced by 0.1-0.15 mm as compared with the case of the usual polyester cord. As apparent from the above, the use of high modulus polyester cord can not basically solve the problem on the ruggedness in the shoulder portion.

Considering the fact that the degree of ruggedness is not more than 0.3 mm to solve the problem in the shoulder portion, the number of overlapped cords must be not more than 3 in case of using the high modulus polyester cord. However, the feature that such a few overlap number is obtained by the usual tire building step brings about the large reduction of the building efficiency.

SUMMARY OF THE INVENTION

The inventors have made various studies in order to fundamentally solve the problem on the ruggedness of the tire shoulder portion by using a single carcass ply while maintaining the high-speed durability, low rolling resistance and cornering stability without lowering the building efficiency. As a result, it has been found that although two carcass plies each containing relatively fine cords (for example, polyester cord of 1000 d/2) are used from a viewpoint of the necessity for ensuring the tire safety and tire rigidity in relatively large size radial tire for passenger car having a JIS normal load of not less than 450 kg (at an internal pressure of 1.70 kgf/cm$^2$) among the conventional radial tires for passenger cars, the problems inherent to the use of two carcass plies such as separation failure during high-speed running resulted from the interlaminar shearing force between the two carcass plies and degradation of rolling resistance due to heat build-up can be solved by using a particular cord as a carcass ply cord and limiting the carcass ply number to one.

As to the ruggedness of the shoulder portion, it has simultaneously been found that (a) since the ruggedness of the shoulder portion is determined by the number of overlapped cords at this position, modulus of cord and heat shrinkage of cord is reduced as the number of overlapped cords becomes small or the cord modulus becomes high or the heat shrinkage becomes small, and (b) when the degree of ruggedness in the shoulder portion is 0.3 mm, the ruggedness is not observed at the tire surface from a viewpoint of an appearance and can not substantially be recognized in the shoulder portion by touch.

Based on such knowledge, it has been confirmed that when a single carcass ply containing particular high tenacity vinylon cord as a carcass ply cord is applied to a relatively large size radial tire comprising a carcass usually composed of two carcass plies, tire performance such as high-speed durability, rolling resistance and the like are improved and the ruggedness of the shoulder portion is fundamentally solved to improve the tire appearance. Also when the above single carcass ply is applied to a relatively small size radial tire for a passenger car comprising a carcass usually composed of a single carcass ply, the amount of cord used and the end count can be reduced to attain a low fuel consumption and the degree of ruggedness in shoulder portion is fundamentally solved. As a result the invention has been accomplished.

According to the invention, there is the provision of in a low rolling resistance pneumatic radial tire comprising a tread portion, a pair of side portions extending from both ends of the tread portion, a pair of bead portions located at inward ends of the side portions, and a tire reinforcement consisting of a carcass composed of a single rubberized carcass ply containing cords arranged in the radial direction of the tire and a belt superimposed about a crown region of the carcass and composed of at least one belt layer, the improvement wherein as the carcass ply cord is used a high tenacity vinylon cord satisfying that the carcass ply cord embedded in the tire after vulcanization has characteristics represented by the following equations (1)-(3):

$$0.5 \leq E \leq 3 \quad (1)$$
$$E \times \Delta S \leq 5 \quad (2)$$
$$S \geq 14.5 - 12 N_T \quad (3)$$

, where E is an elongation (%) at 2.25 g/d, $\Delta S$ is a heat shrinkability (%) measured at such a state that the cord is left to stand at 177° C. under a load of 0.015 g/d for 30 minutes, S is a strength (g/d) per gram denier of the carcass ply cord, $N_T$ is a twisting coefficient represented by $N_T = N \times \sqrt{0.139 \times D/\rho} \times 10^{-3}$ and is $0.27 < N_T < 0.55$, N is a twisting number per 10 cm of cord length (T/10 cm), D is a half of total denier of cord and $\rho$ is a specific gravity of cord, and the number of overlapped cords in a joint portion of the carcass ply at a shoulder portion in the circumferential direction of the tire is not more than 15.

BRIEF DESCRIPTION OF THE DRAWINGS

The invention will be described with reference to the accompanying drawings, wherein:

FIG. 1a is a schematic view illustrating the number of overlapped cords and the degree of ruggedness at a shoulder portion of a tire having a tire size of 185/70 HR 13;

FIG. 1b is a graph showing a relation between the number of overlapped cords and the degree of ruggedness at the shoulder portion of the tire shown in FIG. 1a when usual polyester (PET) cord or high modulus PET cord is used as a carcass ply cord; and FIG. 2 is a graph showing a relation between number of overlapped cords and degree of ruggedness at a shoulder portion of a tire with a tire size of 175/70 SR 13 using six kinds of fiber cords as a carcass ply cord.

DETAILED DESCRIPTION OF THE INVENTION

In the tire according to the invention is used a single carcass ply containing high tenacity vinylon cords satisfying the aforementioned equations (1), (2) and (3). When the elongation E at 2.25 g/d of the carcass ply cord is not more than 3%, even if the number of overlapped cords is about 15, it is possible to restrain the degree of ruggedness at the shoulder portion to not more than 0.3 mm, and there is no problem on the ruggedness of the shoulder portion when using such a higher modulus vinylon cord. Vinylon is a tradename for polyvinyl alcohol.

This is apparent from the following experimental results made by the inventors. That is, nylon 66 (66N) cord, polyethylene terephthalate (PET) cord, high modulus PET cord disclosed in Japanese Patent laid open No. 60-113,702, rayon cord, high tenacity vinylon cord according to the invention and Kevlar cord (trade name of aromatic polyamide fiber cord, made by Du Pont) as shown in the following Table 1 were used as a carcass ply cord, respectively. A single carcass ply containing each of the above cords at an end count of 32 cords/5 cm in a circumferential direction of tire crown center was used to produce a tire having a tire size of 175/70 SR 13. A relation between number of overlapped cords and degree of ruggedness d at shoulder portion when the tire is inflated under an internal pressure of 2.5 kg/cm² is shown in FIG. 2.

TABLE 1

| Kind of cord | Properties of fiber | | | | Twisting number (T/10 cm) | Elongation at 2.25 g/d (%) |
| --- | --- | --- | --- | --- | --- | --- |
| | strength (g/d) | elongation at a stress of 4.5 g/d (%) | specific gravity | Cord structure | | |
| 66N | 9.5 | 11.0 | 1.43 | 1260 d/2 | 39 × 39 | 12 |
| PET | 8.0 | 6.4 | 1.38 | 1500 d/2 | 40 × 40 | 6 |
| High modulus PET | 7.8 | 6.4 | 1.38 | 1500 d/2 | 40 × 40 | 5 |
| Rayon | 5.1 | 4.1 | 1.52 | 1650 d/2 | 47 × 47 | 4 |
| High tenacity vinylon | 17.5 | 1.8 | 1.30 | 1500 d/2 | 40 × 40 | 2.5 |
| Kevlar | 22.0 | 0.9 | 1.44 | 1500 d/2 | 40 × 40 | 1 |

It is obvious from FIG. 2 that when using the high modulus PET cord, it is difficult to restrain the ruggedness of the shoulder portion to not more than 0.3 mm unless the number of overlapped cords is not more than 3.

Moreover, it is apparent from the inventors' examination that since the tire is enlarged at the building and vulcanization step, the number of overlapped cords is reduced by about 20% in the tire building. In order to obtain the number of overlapped cords of not more than 3 in the tire product, it is necessary to make the number of overlapped cords to not more than 2.4 at the tire building, which largely lowers the tire building efficiency.

As mentioned above, it is possible to reduce the ruggedness of the shoulder portion by making the modulus of the carcass ply cord high.

On the other hand, when the elongation E at 2.25 g/d is less than 0.5, the twisting number should be made extremely small and the fatigue resistance lowers, so that it is unfavorable in practical use.

The heat shrinkability $\Delta S$ will be described below.

As previously mentioned, it is possible to reduce the degree of ruggedness at the shoulder portion by making the modulus of the carcass ply cord high. Incidentally, the high modulus polyester cord obtained by reducing the twisting number to 20×20 T/10 cm and performing the adhesive treating step at a temperature lower by 50° C. than the usual heat treating temperature and under a high tension was used as a carcass ply cord and the vulcanization was carried out in the conventional manner. This cord taken out from the resulting tire had an elongation at 2.25 g/d of 3%. In the tire using such a forcedly drawn polyester cord, the degree of ruggedness at the shoulder portion was 0.4 mm even with 3 overlapped cords of and could not be made to not more than 0.3 mm.

This is due to the fact that since the polyester cord is forcedly drawn, the heat shrinkability thereof increases and there is produced a difference in heat shrinkability between the joint portion and the non-joint portion of the carcass ply. That is, even when the elongation at 2.25 g/d in the non-joint portion is as high as 3%, since a tension applied to one cord in the joint portion is half of that in the non-joint portion, the difference in heat shrinkage of cord between the joint portion and the non-joint portion causes a great difference in periphery length of carcass ply cord between both the above portions in the tire after vulcanization.

Therefore, it is desirable to make the heat shrinkage of the cord as small as possible. In this connection, it is essential that the cord after vulcanization satisfies the following equation:

$$E \times \Delta S \leq 5 \qquad (2)$$

in order to fundamentally solve the problem on the ruggedness of the shoulder portion.

On the other hand, according to the invention, it is also essential to use a single carcass ply as a carcass in order to enhance the tire performances such as high-speed durability, low rolling resistance and other performances as mentioned above. That is, the feature of using the single carcass ply instead of the conventional two carcass ply structure each containing polyester cords can be attained by the use of a modified vinylon cord having a high tenacity. It is possible to use the single carcass ply with maintaining the tire safety when the high tenacity vinylon cord embedded in rubber in the tire after the vulcanization has a strength per gram denier S satisfying the following equation:

$$S \geq 14.5 - 12 \, N_T \qquad (3)$$

, wherein $N_T$ is a twisting coefficient represented by $N_T = N \times \sqrt{0.139 \times D/p} \times 10^{-3}$ and is $0.27 < N_T < 0.55$, N is a twisting number per 10 cm of cord length (T/10 cm), D is a half of total denier of cord and $p$ is a specific gravity of cord.

Such a high-elasticity, high-strength vinylon fiber can be produced by a method wherein the drawing ratio is increased during the spinning of a polymer having a molecular weight considerably larger than that of the polymer used in the production of the conventional vinylon fiber, a so-called gel spinning method wherein fiber is spun from a diluted solution of a super-high molecular weight polymer and drawn at a high drawing ratio such is disclosed in Japanese Patent laid open Nos. 60-126,311 and 60-126,312, wherein the structure of amorphous portion is densified by dry and wet spinning, or the like. Furthermore, the modification of vinylon fiber such as improvement of resistance to wet heat degradation or the like can be carried out by such a chemical modification of vinylon that the drawn fiber is subjected to a heat treatment or a post treatment with acetal, formal or the like. Moreover, it is possible to obtain the modified vinylon fiber, which has high elasticity, high strength, low heat shrinkability and considerably improved fatigue resistance capable of withstanding to repetitive stretching and compressive strain inputs in tire, by suppressing chemical modification with a specific solvent, or the like.

Such modified vinylon fibers having a high tenacity are twisted into a cord by the usual manner. In this case, the twisting coefficient represented by $N_T = N \times \sqrt{0.139 \times D/p} \times 10^{-3}$ is required to be $0.27 < N_T < 0.55$. When $N_T$ is not more than 0.27, the fatigue resistance is poor, while when $N_T$ is not less than 0.55, the tenacity lowers and the tire safety using the single carcass ply according to the invention unfavorably reduces.

In the high tenacity modified vinylon cord used in the single carcass ply according to the invention, the cord diameter is desirable to be within a range of 0.3-0.8 mm. When the cord diameter is less than 0.3 mm, the strength per cord lowers and the degradation of a so-called tire safety represented by a product of strength and end count is not avoided. However, when the cord diameter exceeds 0.8 mm, the strength is too high, so that in order to obtain a tire having the same tire safety, it is necessary to make the end count considerably coarse and consequently the degree of ruggedness may be observed over a substantially whole periphery of the shoulder portion. Therefore, it is desirable to use the cords having a diameter of 0.3-0.8 mm at a proper end count.

The invention will be described in detail with reference to the following examples.

EXAMPLES 1-8, COMPARATIVE EXAMPLES 1-10

Radial tires for passenger car having a tire size of 195/70 HR 14 in Examples 1-8 and Comparative Examples 1-10 were manufactured by using a reinforcement consisting of a carcass ply containing cords made of a fiber having properties as shown in the following Table 2 and a belt composed of two belt layers each containing steel cords, provided that the cords of the two belt layers were crossed with each other.

In these tires, the elongation at 2.25 g/d of the cord and the degree of ruggedness at shoulder portion were evaluated by the following evaluation methods. The evaluation results are also shown in Table 2 together with the results of drum durability test and rolling resistance measurement. In this case, the rolling resistance was represented by an index on a basis that the result of Comparative Example 1 was 100.

EVALUATION METHODS:

(1) Elongation (E) of Cord

After the cord was taken out from the tire, the elongation (%) at room temperature of 25°±2° C. under a tensile load of 2.25 g/d was measured from an autograph according to a method of JIS L 1017. Moreover the denier of the fiber before twisting was used as a denier number, because it was required to avoid the complicated change of denier number due to the change of cord length based on the twisting, dipping treatment, shrinking in vulcanization of tire and the like.

(2) Degree of Ruggedness At Shoulder Portion

The degree of ruggedness at the shoulder portion was measured over the whole circumference of the tire in the circumferential direction by means of a surface roughness tester. At first, the tire was inflated under an internal pressure of 2.5 kg/cm² in a room of 25°±2° C. and left to stand for 24 hours, and then the internal pressure was readjusted to perform the measurement on the degree of ruggedness at shoulder portion.

After the measurement, the shoulder portion was cut over the whole in the circumferential direction of the tire to measure the number of overlapped cords in the shoulder portion, from which a relation between the number of overlapped cords and the depth of the ruggedness was determined. Moreover, the degree of ruggedness d at shoulder portion in the joint portion of the carcass ply was determined by depicting a contour line shown by dotted lines in FIG. 1a.

In Comparative Example 1 was used the conventional tire comprising two rubberized carcass plies each containing usual PET cords. The carcass ply had a structure that the usual PET cord of 1000 d/2 as shown in Table 2 was obtained by twisting at a usual twisting number (ply twist.cable twist) of 49×49 T/10 cm as a control.

In Comparative Examples 2, 3, 7 and 8, there were manufactured tires each reinforced with a single carcass ply containing cords of 1500 d/2, each being made from the usual PET fiber at the usual twisting number of 40×40 T/10 cm, at an end count of 38 cords in the tire crown center toward the circumferential direction. In these tires, since the end count was the same as in Comparative Example 1 but the ply number was 1, even if the cord construction was 1500 d/2, the tire safety represented by a product of end count and tenacity was poor as compared with that of Comparative Example 1. When the number of overlapped cords was changed in such a tire, the depth of ruggedness at shoulder portion became large as the number of overlapped cords increased, from which it had been found that the number of overlapped cords is required to be substantially zero in order to make the degree of ruggedness at shoulder portion to not more than 0.3 mm.

In the tire of Comparative Example 4, the usual PET cord of 1500 d/2 was obtained by twisting at a twisting number of 20×20 T/10 cm and then heat treating at 190° C. under a tension of 1.7 g/d with the application of an adhesive. The cord taken out from the tire had an elongation at 2.25 g/d of 3%. When the number of overlapped cords in the joint portion of the carcass ply containing such cords was 3, the degree of ruggedness at shoulder portion was 0.45 mm because of large heat shrinkability, so that the given effect was not obtained.

In Comparative Example 6, the usual PET cord of 1500 d/3 having a twisting number of 33×33 T/10 cm and substantially the same twisting coefficient as in Comparative Examples 2, 3, 7 and 8 was used as a carcass ply cord, and the end count in the tire crown center toward the circumferential direction was 32 cords/5 cm, so that the tire safety was substantially the same as in Comparative Example 1. When the single carcass ply containing such thick cords was used so as to provide the number of overlapped cords of 3, the degree of ruggedness d at shoulder portion was 0.58 mm. This shows that the appearance of the side portion can not be improved by using the carcass ply cord having a larger diameter.

In Comparative Example 5, the high modulus PET cord of 1500 d/2 having a twisting number of 40×40 T/10 cm as disclosed in Japanese Patent laid open No. 60-113,702 was used as a carcass ply cord. In this case, the degree of ruggedness at shoulder portion was 0.4 mm, so that a large reduction of the ruggedness degree at shoulder portion was not observed.

In Comparative Examples 9 and 10 and Examples 8-8, high tenacity modified vinylon cords of 1500 d/2 having different twisting numbers according to the invention were used as a carcass ply cord. In Comparative Example 9, the twisting number was lowered to 20×20 T/10 cm, so that the fatigue resistance and hence drum durability were poor.

In Examples 2-8 and Comparative Example 10, the twisting number of the above high tenacity vinylon cord of 1500 d/2 and the number of overlapped cords in the joint portion of the carcass ply were variously changed. When the twisting number was not more than 33×33 T/10 cm, even if the number of overlapped cords was 15, the ruggedness degree at shoulder portion was 0.3 mm and there was no problem on the appearance of the tire. On the other hand, when the twisting number was 39×39 T/10 cm, the heat shrinkability and the elongation at 2.25 g/d became larger, so that when the number of overlapped cords was 20, the degree of ruggedness at shoulder portion was 0.41 mm and the tire appearance was observed to be rugged. When the number of overlapped cords was not more than 15, the degree of ruggedness at shoulder portion was about 0.3 mm or less and there was no problem on the tire appearance. Further, the rolling resistance was significantly improved as compared with that of Comparative Example 1 owing to the use of the single carcass ply.

The tire safety in Examples 2-8 and Comparative Example 10 was the same as in Comparative Example 1. However, when using the polyester cord, it was impossible to provide tires having the same tire safety unless the cord diameter was made larger than that of the high tenacity vinylon cord.

In Comparative Examples 1-8 other than Comparative Example 4, PET or high modulus PET cords were coated with the usual RFL adhesive, subjected to a usual heat treatment under a tension of about 0.2 g/d, and then rubberized in the usual manner to form a carcass ply. The heat treating temperature was 240° C.

On the other hand, the high tenacity vinylon cords were coated with the usual RFL adhesive, heat treated at a temperature of 200° C. under a tension of about 1 g/d, and then rubberized in the usual manner to form a carcass ply.

TABLE 2(a)

|  | Comparative Example 1 | Comparative Example 2 | Comparative Example 3 | Comparative Example 4 | Comparative Example 5 | Comparative Example 6 |
|---|---|---|---|---|---|---|
| Number of carcass plies | 2 | 1 | 1 | 1 | 1 | 1 |
| Kind of fiber | PET | PET | PET | PET | high modulus PET | PET |
| Cord structure | 1000 d/2 | 1500 d/2 | 1500 d/2 | 1500 d/2 | 1500 d/2 | 1500 d/3 |
| Twisting number (T/10 cm) | 49 | 40 | 40 | 20 | 40 | 33 |
| Twisting coefficient ($N_T$) | 0.49 | 0.49 | 0.49 | 0.24 | 0.49 | 0.50 |
| Cord tenacity (kg) | 14.2 | 21.5 | 21.5 | 22.5 | 20.8 | 33 |
| Cord strength (S) (g/d) | 7.1 | 7.2 | 7.2 | 7.5 | 6.9 | 7.3 |
| Elongation at 2.25 g/d E (%) | 6.0 | 6.0 | 6.1 | 3.0 | 4.0 | 5.0 |
| Heat shrinkability $\Delta S$ (%) | 3.4 | 3.8 | 3.8 | 8.2 | 3.5 | 4.1 |
| E × $\Delta S$ | 20.4 | 22.8 | 23.2 | 24.6 | 14.0 | 20.5 |
| End count (cords/5 cm) | 38 | 38 | 38 | 38 | 38 | 32 |
| Tenacity × end count (safety index) | 1079 (100) | 817 (76) | 817 (76) | 1080 (100) | 790 (73) | 1056 (98) |
|  | ○ | x | x | ○ | x | x |

TABLE 2(a)-continued

|  | Comparative Example 1 | Comparative Example 2 | Comparative Example 3 | Comparative Example 4 | Comparative Example 5 | Comparative Example 6 |
|---|---|---|---|---|---|---|
| 14.5-12 $N_T$ | 8.62 | 8.62 | 8.62 | 11.62 | 8.62 | 8.5 |
| Number of overlapped cords | — | 0 | 3 | 3 | 3 | 3 |
| Degree of ruggedness at shoulder (mm) | 0 | 0.2 | 0.5 | 0.45 | 0.4 | 0.58 |
| Judgement | ○ | ○ | x | x | x | x |
| Drum durability | stopped at 10000 km | stopped at 10000 km | stopped at 10000 km | trouble at 7000 km | stopped at 10000 km | stopped at 10000 km |
| Rolling resistance | 100 | 108 | 108 | 108 | 108 | 104 |

TABLE 2(b)

|  | Comparative Example 7 | Comparative Example 8 | Comparative Example 9 | Comparative Example 10 | Example 1 | Example 2 |
|---|---|---|---|---|---|---|
| Number of carcass plies | 1 | 1 | 1 | 1 | 1 | 1 |
| Kind of fiber | PET | PET | high tenacity vinylon | high tenacity vinylon | high tenacity vinylon | high tenacity vinylon |
| Cord structure | 1500 d/2 | 1500 d/2 | 1500 d/2 | 1500 d/2 | 1500 d/2 | 1500 d/2 |
| Twisting number (T/10 cm) | 40 | 40 | 20 | 39 | 24 | 33 |
| Twisting coefficient ($N_T$) | 0.49 | 0.49 | 0.25 | 0.49 | 0.30 | 0.42 |
| Cord tenacity (kg) | 21.5 | 21.5 | 39 | 30.1 | 37.3 | 33.6 |
| Cord strength (S) (g/d) | 7.2 | 7.2 | 13 | 10.0 | 12.4 | 11.2 |
| Elongation at 2.25 g/d E (%) | 6.1 | 6.0 | 1.0 | 2.1 | 1.5 | 1.6 |
| Heat shrinkability $\Delta S$ (%) | 3.8 | 3.9 | 1.0 | 2.0 | 1.0 | 1.5 |
| E × $\Delta S$ | 23.2 | 23.4 | 1.0 | 4.2 | 1.5 | 2.4 |
| End count (cords/5 cm) | 38 | 38 | 28 | 36 | 29 | 32 |
| Tenacity × end count (safety index) | 817 (76) | 817 (76) | 1092 (101) | 1078 (100) | 1078 (100) | 1078 (100) |
|  | x | x | ○ | ○ | ○ | ○ |
| 14.5-12 $N_T$ | 8.62 | 8.62 | 11.5 | 8.62 | 10.9 | 9.46 |
| Number of overlapped cords | 5 | 15 | 3 | 20 | 3 | 2 |
| Degree of ruggedness at shoulder (mm) | 0.65 | 1.3 | 0.1 | 0.41 | 0.13 | 0.10 |
| Judgement | x | x | x | x | ○ | ○ |
| Drum durability | stopped at 10000 km | stopped at 10000 km | trouble at 6400 km | stopped at 10000 km | stopped at 10000 km | stopped at 10000 km |
| Rolling resistance | 108 | 109 | 110 | 105 | 107 | 106 |

TABLE 2(c)

|  | Example 3 | Example 4 | Example 5 | Example 6 | Example 7 | Example 8 |
|---|---|---|---|---|---|---|
| Number of carcass plies | 1 | 1 | 1 | 1 | 1 | 1 |
| Kind of fiber | high tenacity vinylon | high tenacity vinylon | high tenacity vinylon | high tenacity vinylon | high tenacity vinylon | high tenacity vinylon |
| Cord structure | 1500 d/2 | 1500 d/2 | 1500 d/2 | 1500 d/2 | 1500 d/2 | 1500 d/2 |
| Twisting number (T/10 cm) | 33 | 33 | 39 | 39 | 39 | 39 |
| Twisting coefficient ($N_T$) | 0.42 | 0.42 | 0.49 | 0.49 | 0.49 | 0.49 |
| Cord tenacity (kg) | 33.6 | 33.6 | 30.1 | 30.1 | 30.1 | 30.1 |
| Cord strength (S) (g/d) | 11.2 | 11.2 | 10.0 | 10.0 | 10.0 | 10.0 |
| Elongation at 2.25 g/d E (%) | 1.5 | 1.5 | 2.1 | 2.2 | 2.1 | 2.2 |
| Heat shrinkability $\Delta S$ (%) | 1.5 | 1.5 | 2.0 | 1.9 | 2.0 | 2.1 |
| E × $\Delta S$ | 2.25 | 2.25 | 4.2 | 4.18 | 4.2 | 4.62 |
| End count (cords/5 cm) | 32 | 32 | 36 | 36 | 36 | 36 |
| Tenacity × end count (safety index) | 1078 (100) | 1078 (100) | 1078 (100) | 1078 (100) | 1078 (100) | 1078 (100) |
|  | ○ | ○ | ○ | ○ | ○ | ○ |
| 14.5-12 $N_T$ | 9.46 | 9.46 | 8.62 | 8.62 | 8.62 | 8.62 |
| Number of overlapped cords | 10 | 15 | 0 | 3 | 5 | 10 |
| Degree of ruggedness at shoulder (mm) | 0.25 | 0.3 | 0 | 0.15 | 0.22 | 0.30 |
| Judgement | ○ | ○ | ○ | ○ | ○ | ○ |
| Drum durability | stopped at 10000 km | stopped at 10000 km | stopped at 10000 km | stopped at 10000 km | stopped at 10000 km | stopped at 10000 km |
| Rolling resistance | 106 | 107 | 106 | 105 | 106 | 106 |

EXAMPLES 9-11, COMPARATIVE EXAMPLES 11-14

Radial tires having a tire size of 165 SR 13 in Examples 9-11 and Comparative Examples 11-14 were manufactured by using a reinforcement consisting of a carcass ply containing cords made of a fiber having properties as shown in the following Table 3 and a belt composed of two steel cord layers, the cords of which layers being crossed with each other.

The same performance evaluation tests as shown in Table 2 were made with respect to these tires to obtain results as shown in Table 3.

The tire of Comparative Example 11 comprising a single carcass ply made from the usual PET cord of 1500 d/2 with a twisting number of 40×40 T/10 cm was used as a control tire. Moreover, the cord treating conditions were the same as in Comparative Example 1 of Table 2.

In Comparative Examples 12 and 13, the high modulus PET cords disclosed in Japanese Patent laid open No. 60-113,702 were used so as to provide the same tire safety as in Comparative Example 11. Moreover, the tension was raised to about 1 g/d in the cord treatment. When the number of overlapped cords was 3 in Comparative Example 12 and 9 in Comparative Example 13, the ruggedness degree at shoulder portion was 0.35 mm and 0.65 mm, respectively, and the tire appearance was poor.

In Examples 9-11, the end count was reduced while maintaining the same tire safety as in the control tire, so that the rolling resistance was largely improved. Further, even when the number of overlapped cords was 9, the degree of ruggedness at shoulder portion was not more than 0.3 mm and there was no problem on the appearance of the tire. In Comparative Example 14, however, the drum durability was poor due to the fact that the twisting number was reduced to 20×20 T/10 cm.

Moreover, the cord treating conditions were the same as in Table 2.

As mentioned above, in the radial tires according to the invention, the high tenacity modified vinylon cords were used as a carcass ply cord, so that the number of carcass plies in the relatively large size radial tire conventionally using two carcass plies can be made to one and the end count in the single carcass ply can be reduced to obtain a large effect of improving fuel consumption, while in the small size radial tire the end count can be reduced to provide low fuel consumption.

Further, the problem on the degree of ruggedness at the shoulder portion in the use of single carcass ply can be solved without lowering the efficiency of tire building.

What is claimed is:

1. In a low rolling resistance pneumatic radial tire comprising a tread portion, a pair of side portions extending from both ends of the tread portion, a pair of bead portions located at radially inward ends of the side portions, and a tire body consisting of a carcass composed of a single rubberized carcass ply containing cords arranged in the radial direction of the tire and a belt superimposed about a crown region of the carcass and composed of at least one belt layer, the improvement wherein the carcass ply cord is a high tenacity polyvinyl alcohol cord satisfying that the carcass ply cord embedded in rubber in the tire after vulcanization has characteristics represented by the following equations (1)-(3):

$$1.5 \leq E \leq 3 \quad (1)$$
$$E \times \Delta S \leq 5 \quad (2)$$
$$S \geq 14.5 - 12 N_T \quad (3)$$

, where E is an elongation (%) at 2.25 g/d, $\Delta S$ is a heat shrinkability (%) measured at such a state that the cord is left to stand at 177° C. under a load of 0.015 g/d for 30 minutes, S is a strength (g/d) per gram denier of the cord, $N_T$ is a twisting coefficient represented by $N_T = N \times \sqrt{0.139 \times D/\rho} \times 10^{-3}$ and is $0.27 < N_T < 0.55$, N is a twisting number per 10 cm of cord length (T/10 cm), D is a half of total denier of cord and $\rho$ is a specific gravity of cord, and the number of overlapped cords in a joint portion of the carcass ply at a shoulder portion in the circumferential direction of the tire is not more than 15.

2. The low rolling resistance pneumatic radial tire according to claim 1, wherein said high tenacity polyvinyl alcohol cord has a diameter of 0.3-0.8 mm.

3. The tire according to claim 1 wherein $N_T$ equals 0.30, S equals 12.4 g/d, E equals 1.5%, and $\Delta S$ equals 1.0%.

4. The tire according to claim 1 wherein $N_T$ equals 0.42, S equals 11.2 g/d, E equals 1.6% and $\Delta S$ equals 1.5%.

5. The tire according to claim 1 wherein $N_T$ equals 0.42, S equals 11.2 g/d, E equals 1.5% and $\Delta S$ equals 1.5%.

TABLE 3

|  | Comparative Example 11 | Comparative Example 12 | Comparative Example 13 | Example 9 | Example 10 | Example 11 | Comparative Example 14 |
| --- | --- | --- | --- | --- | --- | --- | --- |
| Number of carcass plies | 1 | 1 | 1 | 1 | 1 | 1 | 1 |
| Kind of fiber | PET | high modulus PET | high modulus PET | high tenacity vinylon | high tenacity vinylon | high tenacity vinylon | high tenacity vinylon |
| Cord structure | 1500 d/2 | 1500 d/2 | 1500 d/2 | 1500 d/2 | 1500 d/2 | 1500 d/2 | 1500 d/2 |
| Twisting number (T/10 cm) | 40 | 40 | 40 | 39 | 39 | 24 | 20 |
| Twisting coefficient ($N_T$) | 0.49 | 0.49 | 0.49 | 0.49 | 0.49 | 0.30 | 0.25 |
| Cord tenacity (kg) | 21.5 | 20.8 | 20.8 | 30.2 | 30.2 | 37.1 | 38.9 |
| Cord strength (S) (g/d) | 7.2 | 6.9 | 6.9 | 10.0 | 10.0 | 12.3 | 13.0 |
| Elongation at 2.25 g/d E (%) | 6.0 | 4.1 | 4.1 | 2.0 | 2.0 | 1.5 | 1.0 |
| Heat shrinkability $\Delta S$ (%) | 3.9 | 3.4 | 3.4 | 2.1 | 2.1 | 1.0 | 1.1 |
| E × $\Delta S$ | 23.4 | 13.9 | 13.9 | 4.2 | 4.2 | 1.5 | 1.0 |
| End count (cords/5 cm) | 36 | 38 | 38 | 26 | 26 | 21 | 20 |
| Tenacity × end count (safety index) | 774 (100) | 774 (100) | 774 (100) | 785 (101) | 785 (101) | 779 (100) | 778 (100) |
| 14.5-12 $N_T$ | 8.62 | 8.62 | 8.62 | 8.62 | 8.62 | 10.9 | 11.5 |
| Number of overlapped cords | 3 | 3 | 9 | 3 | 9 | 3 | 3 |
| Degree of ruggedness at shoulder (mm) | 0.55 | 0.35 | 0.65 | 0.10 | 0.25 | 0.1 | 0.08 |
| Judgement | x | x | x | ○ | ○ | ○ | ○ |
| Drum durability | stopped at 10000 km | stopped at 10000 km | stopped at 10000 km | stopped at 10000 km | stopped at 10000 km | stopped at 10000 km | trouble at 8500 km |
| Rolling resistance | 100 | 100 | 100 | 103 | 103 | 106 | 106 |

6. The tire according to claim 1 wherein $N_T$ equals 0.49, S equals 10.0 g/d, E equals 2.1% and $\Delta S$ equals 2.0%.

7. The tire according to claim 1 wherein $N_T$ equals 0.49, S equals 10.0 g/d, E equals 2.2% and $\Delta S$ equals 1.9%.

8. The tire according to claim 1 wherein $N_T$ equals 0.49, S equals 10.0 g/d, E equals 2.2% and $\Delta S$ equals 2.1%.

9. The tire according to claim 3 wherein the number of overlapped cords is not greater than 3.

10. The tire according to claim 4 wherein the number of overlapped cords is not greater than 2.

11. The tire according to claim 5 wherein the number overlapped cords is not greater than 10.

12. The tire according to claim 6 wherein there are no overlapped cords.

13. The tire according to claim 7 wherein the number of overlapped cords is not greater than 3.

14. The tire according to claim 8 wherein the number of overlapped cords is not greater than 10.

15. The tire according to claim 1 wherein $N_T$ equals 0.49, S equals 10.0 g/d, E equals 2.0% and $\Delta S$ equals 2.1%.

16. The tire according to claim 15 wherein the number of overlapped cords is not greater than 9.

17. The tire according to claim 15 wherein the number of overlapped cords is not greater than 3.

18. The tire according to claim 1 wherein $N_T$ equals 0.30, S equals 12.3 g/d, E equals 1.5% and $\Delta S$ equals 1.0%.

19. The tire according to claim 18 wherein the number of overlapped cords is not greater than 3.

* * * * *